(No Model.)
T. H. SPRINGSTON.
PRUNING IMPLEMENT.
No. 589,987.
Patented Sept. 14, 1897.
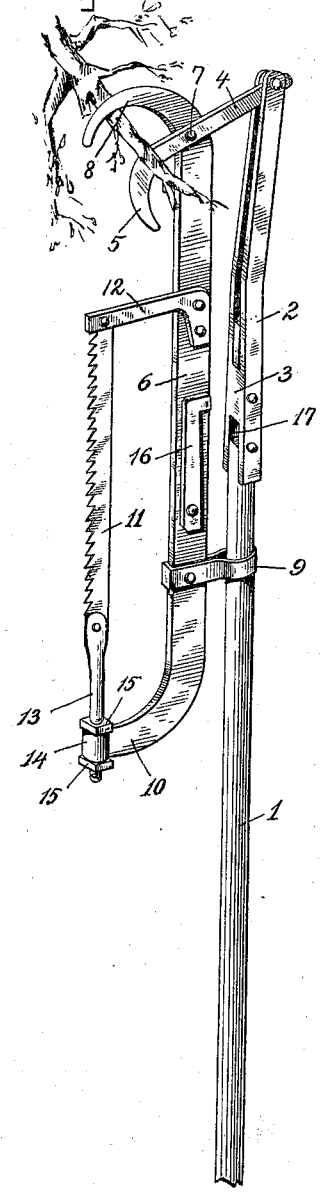
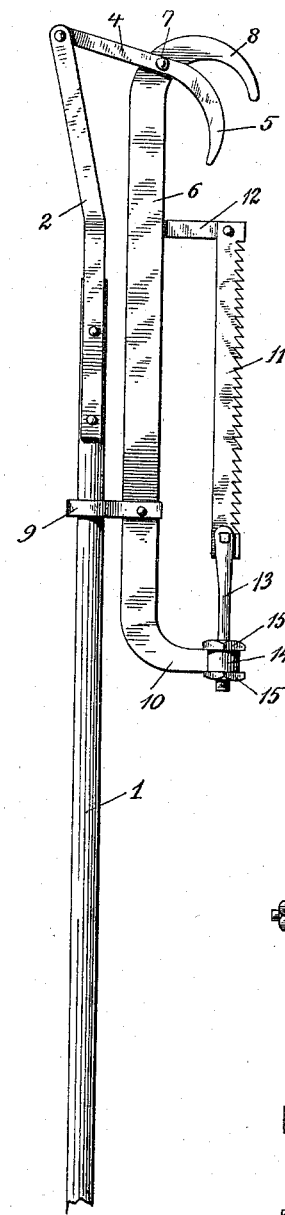
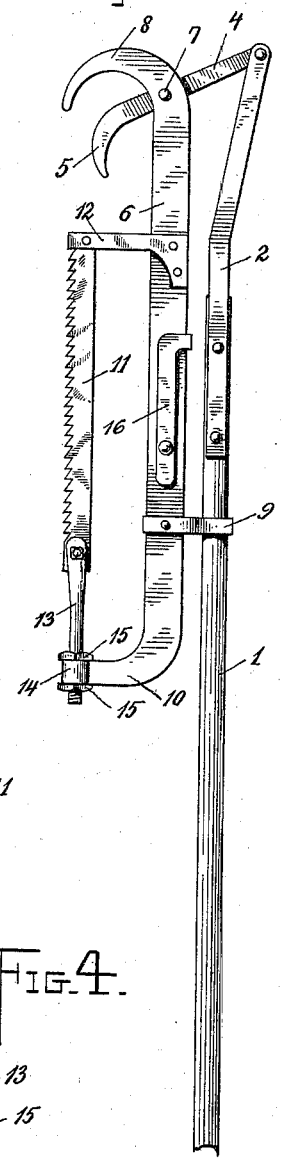
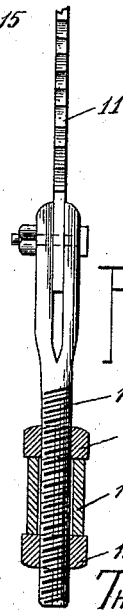
Witnesses
John F. Deufferwiel
By his Attorneys,
Inventor
Thomas H. Springston.

UNITED STATES PATENT OFFICE.

THOMAS H. SPRINGSTON, OF PASCO, WEST VIRGINIA.

PRUNING IMPLEMENT.

SPECIFICATION forming part of Letters Patent No. 589,987, dated September 14, 1897.

Application filed April 2, 1897. Serial No. 630,435. (No model.)

*To all whom it may concern:*

Be it known that I, THOMAS H. SPRINGSTON, a citizen of the United States, residing at Pasco, in the county of Roane and State of West Virginia, have invented certain new and useful Improvements in Pruning Implements, of which the following is a specification.

This invention relates to certain improvements in pruning implements, and has for its object to provide a device of this character of a simple and inexpensive nature which shall be provided with knife-blades for cutting small branches and twigs and a saw for cutting heavy branches and limbs, the parts being so arranged that either said knife-blades or saw shall be held in a convenient position for use at all times.

The invention consists in a pruning implement comprising a handle, a knife-blade carried thereon, a saw-frame mounted to move longitudinally along the handle and having a knife-blade to operate in connection with the first-mentioned knife-blade, a saw-blade carried on the saw-frame, and means to lock the saw-frame against longitudinal movement on the handle.

The invention also contemplates certain novel features of the construction, combination, and arrangement of the various parts of the improved pruning implement, whereby certain important advantages are attained and the device is made simpler, cheaper, and otherwise better adapted and more convenient for use, all as will be herein fully set forth.

The novel features of the invention will be carefully defined in the claims.

In order that my improvements may be the better understood, I have shown in the accompanying drawings one embodiment of the invention, in which drawings—

Figure 1 is a perspective view showing the improved pruning implement with its knife-blades in position for cutting a branch; and Fig. 2 is a side elevation of the implement, showing the construction and arrangement of the knife-blades and saw-frame. Fig. 3 is a view similar to Fig. 2, but showing the opposite side of the implement. Fig. 4 is a sectional view drawn to an enlarged scale and showing the means for straining the saw-blade.

In the drawings, 1 indicates the handle of the improved implement, which may be of any desired length, being made of wood and provided at its upper end with side bars 2, secured to its opposite sides and projecting above its upper end, these side bars being, as shown in Fig. 1, connected together at their lower ends by a tie-piece 3, which extends across the front face of the handle 1 at the upper part thereof. The upper ends of the side bars 2 are bent rearwardly and are provided at their extremities with corresponding perforations to receive a bolt or pin passing between them, on which bolt or pin is pivoted a lever 4, arranged between the side bars and having its outer end provided with a downwardly-curved knife-blade 5, as shown in Figs. 1 and 3.

6 indicates the saw-frame, comprising an elongated bar, the upper end of which is pivoted, as indicated at 7, to the lever 4 and is provided with a forwardly-extending knife-blade 8, curved downward, as shown in the drawings, and adapted to be hooked over the branch to be cut, said blade being arranged opposite to the knife-blade 5, so that when it is hooked over the branch to be cut the blade 5 will stand at the opposite side of the branch, as shown in Fig. 1. The saw-frame 6 is adapted for movement longitudinally along the handle 1 of the implement, and at its lower part said frame is provided with a projecting loop 9 to embrace the handle, so as to guide the saw-frame in its movement, and the lower end of the said saw-frame 6 is bent or curved forwardly, as shown at 10, to form an arm for the attachment of the lower end of a saw-blade 11, which extends up parallel with the body portion of the arm 6, and is connected at its upper end to an arm 12, extending forwardly from said frame below the knife-blade 8 at the upper end thereof.

In order to properly strain the saw-blade 11, the lower end thereof is connected with the upper end of a threaded shank 13, which extends down through an eye 14, formed at the forward end of the arm 10 of the saw-frame, as shown in Fig. 4, and is provided with nuts 15, screwing on it at opposite sides of the eye 14, and in order to lock the saw-frame 6 to the handle 1, to prevent longitudinal movement along the handle when the saw-blade is to be used for cutting, said saw-frame is provided with a latch or dog 16, pivoted to one of its sides, as shown in Fig. 3, and adapted for engagement with a recess 17, formed in the handle 1 below the tie-piece 3, which connects the side bars 2.

In using the improved pruning implement for cutting small branches or twigs with the knife-blades the dog or latch 16 is disengaged from the recess 17, so as to permit the saw-frame to move longitudinally upon the handle 1, whereupon the knife-blade 8 at the upper end of the saw-frame may be hooked over the branch or twig, and the cutting may be accomplished by a downward movement of the handle 1, this movement of the handle serving to swing the lever 4 pivotally, so as to cause the knife-blade 5, carried upon said lever, to cut through the twig or branch. When it is desired to cut a branch or limb by means of the saw-blade 11, the dog or latch 16 is engaged with its recess 17, so as to lock the saw-frame 6 to the handle and prevent longitudinal movement thereof, after which the saw-blade 11 may be applied to the limb or branch, and the cutting may be effected by reciprocating the implement.

From the above description it will be seen that the improved pruning implement is of an extremely simple and inexpensive nature and is especially well adapted for the purposes for which it is designed, since it permits either the knife-blades or its saw-blade to be conveniently used, and it will be obvious from the above description that the invention is susceptible of some modification without material departure from its principles and spirit, and for this reason I do not wish to be understood as limiting myself to the precise form and arrangement of the parts herein set forth.

Having thus described the invention, I claim—

1. In a pruning implement, the combination of a handle, a saw-frame movable along the handle and provided with a knife-blade, a saw-blade also carried by the saw-frame, means to lock the saw-frame against longitudinal movement on the handle, and a knife-blade carried by the handle and arranged to operate in connection with the knife-blade of the saw-frame, substantially as set forth.

2. In a pruning implement, the combination of a handle, a saw-frame movable along the handle and pivotally connected to the lever, said saw-frame having a saw-blade and being provided with a knife-blade, a lever fulcrumed at its inner end on the handle and pivoted between its ends to the saw-frame, adjacent to the knife-blade thereof, and having its outer portion forming a knife-blade, arranged to coöperate with the said blade, and means to lock the saw-frame against movement along the handle, substantially as set forth.

3. In a pruning implement, the combination of a handle, side bars secured to the upper end thereof and connected by a tie-piece extending across the front of the handle, a lever pivoted to the upper ends of the side bars and having a knife-blade, a saw-frame having its lower end guided on the handle and its upper end pivotally connected to the lever and provided with a knife-blade to operate in connection with the knife-blade on the lever, a saw-blade carried by the saw-frame, and a dog pivoted to the saw-frame and arranged to engage a recess in the handle beneath said tie-piece to hold the saw-frame against longitudinal movement on the handle, substantially as set forth.

In testimony that I claim the foregoing as my own I have hereto affixed my signature in the presence of two witnesses.

T. H. SPRINGSTON.

Witnesses:
W. L. STARKEY,
GEO. F. CUNNINGHAM.